United States Patent [19]
Billieres

[11] Patent Number: 5,499,670
[45] Date of Patent: Mar. 19, 1996

[54] TUBELESS TIRE WITH BEAD PROTECTORS HAVING AIR-IMPERMEABLE LAYER AND METHOD FOR PRODUCING SAME

[75] Inventor: Jean Billieres, Clermont-Ferrand, France

[73] Assignee: Compagnie Generale Des Etablissements Michelin–Michelin & Cie, Clermont-Ferrand Cedex, France

[21] Appl. No.: 244,761

[22] PCT Filed: Dec. 21, 1992

[86] PCT No.: PCT/EP92/02972

§ 371 Date: Jun. 8, 1994

§ 102(e) Date: Jun. 8, 1994

[87] PCT Pub. No.: WO93/12943

PCT Pub. Date: Jul. 8, 1993

[30] Foreign Application Priority Data

Dec. 31, 1991 [FR] France ................... 91 16458

[51] Int. Cl.⁶ .................. B29D 30/08; B60C 5/14; B60C 15/00; B60C 15/06
[52] U.S. Cl. .............. 152/543; 152/510; 152/539; 152/547; 152/DIG.16; 156/95; 156/110.1; 156/123; 156/133; 156/135
[58] Field of Search .................... 152/543, 513, 152/510, DIG. 16, 544, 547, 539; 156/95, 110.1, 123, 133, 135

[56] References Cited

U.S. PATENT DOCUMENTS

| | | | |
|---|---|---|---|
| 1,243,576 | 10/1917 | Archer | 152/543 X |
| 2,587,428 | 2/1952 | Antonson | 152/510 |
| 2,676,636 | 4/1954 | Sarbach | 152/510 |
| 2,698,041 | 12/1954 | Morrissey et al. | 152/510 |
| 2,698,042 | 12/1954 | Perkins | 152/543 X |
| 2,939,503 | 6/1960 | Fröhlich et al. | 152/510 |
| 2,985,217 | 5/1961 | Kuhlman, Jr. | 152/543 |
| 3,038,515 | 6/1962 | Koch et al. | 152/510 |
| 3,937,862 | 2/1976 | Dillenschneider | 156/123 X |
| 4,089,360 | 5/1978 | Böhm | 152/510 X |
| 4,483,382 | 11/1984 | Koch et al. | 152/543 |
| 4,953,605 | 9/1990 | Kawamura et al. | 152/547 X |
| 5,080,158 | 1/1992 | Kawamura | 152/547 X |
| 5,265,660 | 11/1993 | Rye et al. | 152/543 X |

FOREIGN PATENT DOCUMENTS

| | | | |
|---|---|---|---|
| 0122731 | 11/1946 | Australia | 152/543 |
| 0448905 | 10/1991 | European Pat. Off. | |
| 2299978 | 9/1976 | France | |
| 2611210 | 8/1988 | France | |
| 2636889 | 3/1990 | France | |
| 1035500 | 7/1958 | Germany | |
| 63-82802 | 4/1988 | Japan | 152/510 |

OTHER PUBLICATIONS

Database WPIL, Week 9141, 7 Feb. 1991, Derwent Publications Ltd., London, GB; AN 91–302067 & SU, A, 1 625 713 (Large Tyre Res Inst) 7 Feb. 1991.

Primary Examiner—Adrienne C. Johnstone
Attorney, Agent, or Firm—Brumbaugh, Graves, Donohue & Raymond

[57] ABSTRACT

The invention concerns the structures and production of tubeless tire beads the seal of which on the rim and the resistance to degradation of which are increased. The beads, at least the surfaces of which in contact with the rim are formed of protectors (7), are covered, in accordance with the invention, with an air impermeable rubber mix (8) at least in part over the portion of the protector in contact with the rim. Extension of the covering (8) over the surface of the protector which is in contact with the inflation air is desirable.

9 Claims, 1 Drawing Sheet

TUBELESS TIRE WITH BEAD PROTECTORS HAVING AIR-IMPERMEABLE LAYER AND METHOD FOR PRODUCING SAME

BACKGROUND OF THE INVENTION

The invention relates to tires of the so-called "tubeless" type and, more particularly, to the beads of such tires.

Such tires, which are widely used, particularly for trucks, have a radial carcass reinforcement which is reinforced with cables located approximately in planes including the axis of rotation of the tire, surmounted by a crown reinforcement and a tread, the carcass ply or plies being wound at each of their two ends around a substantially unstretchable bead ring.

In the case of tubeless tires, it is necessary that the inflation atmosphere not be subjected to losses by diffusion into the materials of the mounted assembly or by leaks caused by a poor seal of the different connecting surfaces between tire and rim.

In order to minimize the diffusion phenomena as much as possible, the inner surface of these tires is generally covered with a layer of "inner rubber" selected for its excellent impermeability to the inflation atmosphere. In general, the vulcanized rubbers used for this internal layer do not have good mechanical properties since they are frequently formulated with rubbers having a base of polyisobutylene or their substantially non-unsaturated, slightly reinforced derivatives in order to optimize the properties of impermeability to the inflation atmosphere, resilience, deformability, and adhesion to the carcass. French patent application 72/43974 describes this aspect of the prior art.

In order to minimize the leaks possible at the contact interfaces of the beads on the rim, particular care must be taken in the design and production of these surfaces, as well as in maintaining them in good condition. Tightness is assured by good pressure contact of the beads of the tires on the rims, the clamping force being assured by the internal pressure of the inflation atmosphere and the shapes of the surfaces which rest against each other.

The contact between the bead of the tire and the rim must also assure good transmission of the mechanical forces resulting from the driving or braking torques by a connection which is without substantial slippage, avoiding excessively rapid wear of the surfaces of the bead. In order to fulfill this role, the vulcanized rubber touching the rim and forming the transition with the carcass reinforcement and the bead ring or rings has high values of hardness and modulus of elasticity. It is generally formulated with elastomers which are generally very unsaturated, highly loaded and cross-linked. This mix, which also assures a role of protecting the bead ring or rings and the carcass reinforcement or reinforcements is frequently known as a "protector", since it in particular prevents direct injury to them by the tools used during the operations of mounting and dismounting the tire on its rim.

Tire carcass reinforcements have experienced substantial improvements in quality which makes it possible to reuse them several times by retreading the portion which has become worn in contact with the ground. The surfaces and/or edges of the rubber of the beads are therefore subjected to more frequent mounting and dismounting operations, which can damage them. Furthermore, the beads are subjected to greater aging stresses, due to the longer operating life of the carcasses. In fact, after prolonged tests of tires mounted on rims subjected to heating due to braking, deterioration is noted in the adherence of the carcass reinforcement cables in the region of the beads, as well as a change in the properties of the protector in contact with the rims and of the part in contact with the inflation atmosphere; these parts of the protector are substantially hardened and may even thereby become much too fragile and brittle. This hardening and the cracking which results from it favor leakage of the inflation atmosphere.

SUMMARY OF THE INVENTION

The object of the present invention is to overcome said drawbacks by partially covering the protector, formed in part of vulcanized rubber of high stiffness similar to the protectors of the prior art, by a layer of a rubber mix which is much more air-impermeable, which may be similar to the formulations and properties of the sealing rubber, thus assuring the contact with the rim in an unusual manner. A substantial increase is noted in the life of the protectors and of the underlying plies and reinforcements, thus solving the problems encountered, in particular with respect to the mechanical properties and seal of beads, without impairing the other properties or the performance of the tire.

In accordance with the invention, a tubeless tire having carcass reinforcement which is turned up around bead rings in the beads and covered on the inside by a layer of rubber of slight stiffness which is impermeable to the inflation air when the tire is inflated, the beads being covered, at least in the part thereof intended to be in contact with the tire's standard rim, by circumferential profiled members known as protectors, formed of non-air-impermeable rubbers of high stiffness, is characterized by the fact that the protectors are partially covered, at least radially to the inside and axially towards the inside by a layer of air-impermeable rubber mix, that is to say, having a coefficient of permeability to air at 80° C. less than $$\frac{21 \times 10^{-17} \times m^2}{s \times Pa}$$

and preferable less than $$\frac{14 \times 10^{-17} \times m^2}{s \times Pa}$$

and, more particularly, less than $$\frac{7 \times 10^{-17} \times m^2}{s \times Pa}$$

and of a thickness of between 0.1 and 1 mm, covering the radially inner part of the protector over an axial length such that the ratio of said length to the axial width of the bead is between 0.2 and 0.7, without being penalized by the drawbacks resulting from the presence of a slightly-rigid rubber mix in contact with the rim, namely poor clamping of the tire on its rim, which would result in poor transmission of the driving and braking torques, and poor mechanical resistance of the bead, with excessive abrasion. One can, in fact, accept for this air-impermeable rubbermix rather low values of rigidity, expressed by the modulus of elasticity at 10% elongation E10=load/initial cross-sectional area between 1.5 and 8 MPa, even on the radially most inner part of the protector.

In accordance with another aspect of the invention, it is advantageous for the layer of air-impermeable rubber mix added on the beads to assure continuity by contact with the sealing rubber covering the inner side of the tire. It is nevertheless of interest to produce tires the protectors of which are covered with air-impermeable rubber mix only primarily on the portion touching the seats of the rim, or primarily on the surface in contact with the inflation air. This layer of air-impermeable rubber mix used in accordance with these provisions greatly slows down the degradation of the protector and of the underlying plies, which will permit more numerous repeated use of the carcass by retreading. The solution proposed by the invention may, it is believed, also combat the harmful effects of the oxygen of the inflation air which can infiltrate between the protector and the rim from the inside of the tire and pass axially towards the heel of the bead. This infiltration could be due to the decrease in the clamping forces in the axially inner zone of the bead upon the forces during travel.

DESCRIPTION OF THE DRAWING

The sole figure of the accompanying drawing will make it more easily understood how the invention can be reduced to practice.

This figure shows a cross section in the zone of a bead B mounted on its seat J in the case of a tire in accordance with the invention.

DESCRIPTION OF PREFERRED EMBODIMENTS

Figure 1:
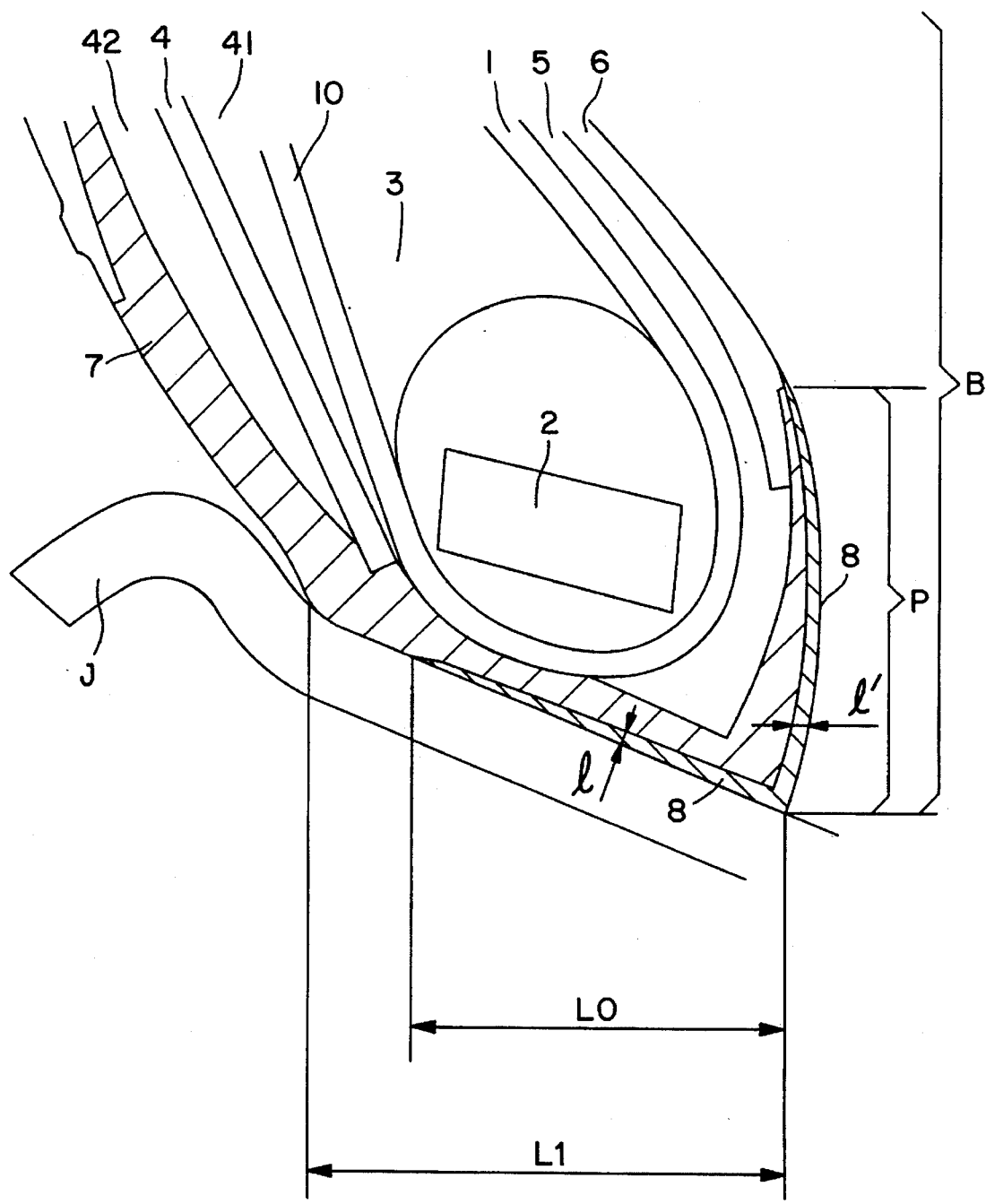

A carcass reinforcement 1 is anchored to a bead ring 2 in the bead B, forming a turn-up 10 which is folded onto a rubber filler 3 and supplemented by a stiffener 4 contained between two layers of rubber 41 and 42 and located axially to the outside of the turn-up 10. The carcass reinforcement 1 is covered towards the inside by a layer of reinforcement rubber 5, itself covered by a layer of inner rubber 6 of a thickness of between 1 and 3 mm, selected for its air-impermeability characteristics, and terminating in the inner part or tip P of the bead.

The bead B of the prior art is covered axially to the outside, radially to the inside and axially to the inside along a portion of the outer course of the plies or rubbers (42, 4, 41, 1, 5, 6) by a protector 7 formed generally of a very rigid vulcanized rubber having good properties of resistance to wear on the rim.

In accordance with the invention, this protector 7 is covered by a layer of air-impermeable rubber mix 8 which may or may not be of the same composition as the inner rubber 6. This layer 8 extends axially below the seat of the bead B over a distance L0 measured from the tip of the bead such that its ratio L0/L1 to the total width L1 of the seat of the bead between 0.2 and 0.7. The layer 8 is furthermore of a substantially constant thickness 1 of between 0.1 and 1 mm. It can be extended towards the inside in a radial direction with a thickness 1' of between 0.1 and 2 mm, over the surface of the protector which faces the inflation air, preferably assuring continuity by contact with the layer 6. An extension of the layer 8 on the outer side (between the bead and the flange of the rim) is excluded in order to preserve a good clamping of the tire on the rim. In another version, the layer of rubber 8 covers substantially a part of the protector which is in contact with the rim with or without a slight covering of the inner surface of the protector 7 which is directed towards the inflation air. In another version, the layer of rubber 8 covers substantially the part of the protector which faces the inflation air, with a slight radially inner covering in an axially outward direction of a part of the protector 7 in contact with the rim.

Various practical embodiments of the invention are possible: for example, the different layers of rubber of the zone of the beads can be placed one by one on the tire-building drum in conventional manner, first the air-impermeable rubber layer 8, then the layer 6 which is to come in contact or superposition with it, then the layer 7, and then the other components, added in customary manner. In the event that the rubbers 8 and 6 are of the same composition, it is also possible to deposit them in a single step and then put the protector 7 in position. Another embodiment consists in preparing in advance the layer of protector 7 provided with a layer of air-impermeable rubber mix 8 and, in a single operation, placing this assembly on the tire-building drum before or after the layer 6, or on the blank of the raw tire. The assembly 7 plus 8 can be produced by stacking layers obtained by calendering or by coextrusion. The layer 8 can also be applied on the cured tire. The layer 8 can also be obtained by applying a fluid dispersion of the components of the mix, also on the raw tire or else after curing. The layer 8 can be applied upon retreading operations or even upon inspection dismountings and maintenance operations of the tires, which makes it possible to treat tires which have still not benefitted from this improvement and to repair beads of tires in accordance with the invention. The vulcanization of layer 8 applied on a cured tire may be effected by heating for rubbers which do not vulcanize at ambient temperature.

A truck tire provided with beads in accordance with the invention which has been subjected to a prolonged travel test exhibits a substantially intact protector 7 which still assures good tightness, while the protector 7 of a control tire in accordance with the prior art is greatly hardened by thermal oxidation and may even exhibit cracks. Furthermore, the commencements of separation of the cables of the carcass reinforcement 1 in the zone of the beads are far less numerous in the event that the protector is covered with the layer of rubber 8. It is generally noted that the beads in accordance with the invention make it possible to triple the duration of the travel tests before obtaining the same level of degradation as those of the prior art.

I claim:

1. A tubeless tire which has a carcass reinforcement (1) turned up around bead rings (2) in beads (B) and is covered on the inside with a layer of rubber of slight stiffness (6) which is impermeable to the inflation air when the tire is inflated, the beads being covered, at least in the part thereof intended to be in contact with the tire's standard mounting rim, by circumferential profiled members (7) known as protectors, formed of non-air-impermeable rubbers of high stiffness, the tire being characterized by the fact that the protectors (7) are partially covered, at least radially to the inside and axially towards the inside, by a layer of air-impermeable rubber mix (8) of a coefficient of permeability to air at 80° C. of less than $$\frac{21 \times 10^{-17} \times m^2}{s \times Pa}$$

and of a thickness 1 of between 0.1 and 1 mm, covering in each bead the radially inner part of the protector (7) over an axial length L0, such that the ratio L0/L1 of L0 to the axial width L1 of the bead (B) is between 0.2 and 0.7.

2. A tire according to claim 1, characterized by the fact that the layer of air-impermeable rubber mix (8) is extended towards the inside in a radial direction over the surface of the protector which faces the inflation air by a layer of air-impermeable rubber mix of a thickness l' of between 0.1 and 2 mm, assuring continuity by contact with the inner rubber (6).

3. A tire according to claim 1, characterized by the fact that the layer of air-impermeable rubber mix (8) has a coefficient of permeability to air at 80° C. of less than $$\frac{14 \times 10^{-17} \times m^2}{s \times Pa}.$$

4. A tire according to claim 1, characterized by the fact that the layer of air-impermeable rubber mix (8) has a coefficient of permeability to air at 80° C. of less than $$\frac{7 \times 10^{-17} \times m^2}{s \times Pa}.$$

5. A tire according to claim 1, characterized by the fact that the layer of air-impermeable rubber mix (8) has a modulus of elasticity at 10% elongation E10=load/initial cross-sectional area of between 1.5 and 8 MPa.

6. A method for the production of a tubeless tire which has a carcass reinforcement (1) turned up around bead rings (2) in beads (B) and is covered on the inside with a layer of rubber of slight stiffness (6) which is impermeable to the inflation air when the tire is inflated, the beads being covered, at least in the part thereof intended to be in contact with the tire's standard mounting rim, by circumferential profiled members (7) known as protectors, formed of non-air-impermeable rubbers of high stiffness, wherein the improvement comprises the step in the production of the tire of at least partially covering the protectors (7), at least radially to the inside and axially towards the inside, with a layer of air-impermeable rubber mix (8) of a coefficient of permeability to air at 80° C. of less than $$\frac{21 \times 10^{-17} \times m^2}{s \times Pa}$$

and of a thickness l of between 0.1 and 1 mm, covering in each bead the radially inner part of the protector (7) over an axial length L0, such that the ratio L0/L1 of L0 to the axial width L1 of the bead (B) is between 0.2 and 0.7.

7. A method for the production of a tubeless tire as claimed in claim 6, characterized by the fact that each protector (7) provided with its layer of air-impermeable rubber mix (8) is placed on a building drum or on a blank of the raw tire in a single operation.

8. A method for the production of a tubeless tire as claimed in claim 6, characterized by the fact that the layer of air-impermeable rubber mix (8) is placed on the raw or cured tire.

9. A method for the production of a tubeless tire as claimed in claim 6, characterized by the fact that the layer of air-impermeable rubber mix (8) is obtained by application of a fluid dispersion of the components of the mix onto the raw or cured tire.

* * * * *